United States Patent Office 3,302,712
Patented Feb. 7, 1967

3,302,712
AQUEOUS SOLUTION FLOW IN A SUBTERRANEAN FORMATION
Harold L. Townsend and Sherrod A. Williams, Jr., Dallas, Tex., assignors to Mobil Oil Corporation, a corporation of New York
No Drawing. Filed Sept. 24, 1964, Ser. No. 399,075
16 Claims. (Cl. 166—9)

This invention relates to recovering oil from subterranean formations. More particularly, this invention is directed to recovering oil from a subterranean formation by flowing therethrough an aqueous solution.

The oil accumulated in subterranean formations is recovered or produced therefrom through wells, called production wells, drilled into the subterranean formations. A large amount of the oil is left in a subterranean formation if produced only by primary depletion, i.e., where only initial formation energy is used to recover the oil. Supplemental operations, often referred to as secondary recovery operations, are used to improve the extent of recovery of the oil. In the most successful and most widely used supplemental recovery operations, a fluid is injected through at least one well, called an injection well, and passed through the formation. Oil is moved through the formation and is produced from one or more production wells as the injected fluid passes from the injection well toward the production wells.

Two major types of sweep efficiency—macroscopic or areal sweep efficiency and microscope sweep efficiency—influence the effectiveness of the passage of the injected fluid through the formation.

The first type, the macroscopic or areal sweep efficiency, is most seriously affected by the permeability stratification of the subterranean formation and by the difference between the viscosity of the in-situ oil and the injected fluid. In any operation in which a fluid is injected through an injection well to supplement recovery of the oil from a subterranean formation, permeability stratification is significant. It is particularly significant in secondary recovery operations. By causing a disproportionately large amount of the injected fluid to enter the more permeable zones, the stratification results in premature production of the injected fluid at a production well. This premature production is referred to as premature breakthrough and is reflected as an increasing ratio of the injected fluid to the oil in the produced fluids. Thus, premature breakthrough can render even an otherwise well-engineered recovery project relatively ineffective because of the cost of treating and recycling the injected fluid.

A sharp difference in viscosity between that of the in-situ oil and that of the injected fluid creates a situation referred to as instability when the viscosity of the injected fluid is less than that of the in-situ oil. The less viscous injected fluid tends to develop fingers or bulges which may be caused by a point of minute inhomogeneity in the formation. These fingers grow and travel at a much faster rate than the remainder of the injected fluid, and thus also cause premature breakthrough.

Various means have been proposed to avoid premature breakthrough. Selective plugging operations have been taught to correct permeability stratification. Viscosity gradation, wherein there is employed an intermediate liquid or liquids having a viscosity between that of the injected fluid and that of the in-situ oil, is taught to cure or minimize instability fingering. One method which has been taught to correct both the permeability stratification and the instability fingering involves the use of a thickener in the leading edge of the flooding or displacing liquid comprising one of the injected fluids. More specifically, it has been taught to add thickeners to the leading edge of a waterflood, i.e., a recovery operation wherein the injected displacing liquid is water.

The second type of sweep efficiency, the microscopic sweep efficiency, is influenced by the interfacial tension between the injected fluid and the in-situ oil, by the contact angle measured between the oil-injected fluid interface and the solid surface, and by the permeability of the formation. To achieve improved microscopic sweep efficiency, it has been taught to add a surfactant to an injected fluid to decrease the interfacial tension and to alter the contact angle. One of the problems encountered with the use of surfactants is the adsorption of the surfactant onto the surfaces of the subterranean formation and extraction of the surfactant from the aqueous solution by the large quantities of oil intimately mixed therewith. Available methods of altering permeability, such as fracturing or acidizing, are of limited benefit in improving microscopic sweep efficiency since they do not affect to any great extent the over-all permeability of the formation, but rather create only localized flow channels of high permeability.

Despite experimental and field use of the foregoing additives and methods, much oil continues to remain in a subterranean formation after the best recovery mechanisms heretofore known have been employed.

It is an object of this invention to provide a method of recovering additional oil from a subterranean formation by passing therethrough an aqueous flooding liquid which will have and will retain the properties of a surfactant and a positive nonsimple liquid and thus increase both the macroscopic and the microscopic sweep efficiencies of a waterflood, even in the presence of large quantities of oil.

It is another object of this invention to provide a method of displacing substantially all of the oil from a formation in the vicinity of an injection well.

Further objects and attendant advantages will become apparent from the following description of the invention.

In accordance with the invention, there is provided an improvement in a method for recovering oil from an oil-containing subterranean formation wherein there is injected a flooding liquid through an injection well and into the formation, and oil is produced from the formation through a production well. The improvement comprises injecting into the formation an aqueous solution having incorporated therein from 0.04 to 0.77 mol percent of an ammonium or alkali metal salt which forms a strong electrolyte in water, and from 0.0008 to 0.04 mol percent of at least one M dialkyl sulfosuccinate having the following structural formula:

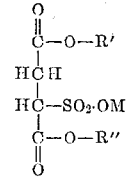

(1)

where

M is a cation and is Li⁺, K⁺, Na⁺, NH₄⁺, anilinium, o-toluidinium, p-toluidinium, m-toluidinium, methylammonium, ethylammonium, n-propylammonium, isopropylammonium, n-butylammonium, iso-butylammonium, sec-butylammonium, or tert-butylammonium, R' is an alkyl group containing 5 to 16 carbon atoms, inclusive, and R" is an alkyl group containing 5 to 16 carbon atoms, inclusive.

The aqueous solution injected into the formation, by virtue of the amounts of the ammonium or alkali metal salt and the M dialkyl sulfosuccinate employed, is a positive nonsimple liquid having a viscosity and an interfacial tension with the oil in the formation which enables the recovery of additional oil before breakthrough of the flooding liquid without unduly high injection pressures or uneconomically low injection rates, as more fully discussed hereinafter. The solution containing the specified concentrations of ammonium or alkali metal salt and the M dialkyl sulfosuccinate will be termed "the active solution" hereinafter. The reasons why the solution is so termed will later become apparent.

A nonsimple liquid is a liquid which, at the same nominal shear rate, develops differing viscosities when it flows in media, such as earth strata, having differing permeabilities. If a non-simple liquid develops a higher viscosity at a given shear rate when it flows in more permeable strata than when it flows in less permeable strata at the same shear rate, it is a positive nonsimple liquid in the sense of this invention. A positive nonsimple liquid thus has a unique internal flow control mechanism which operates to afford a more nearly uniform advance of a flooding liquid through a subterranean formation. Further, a positive nonsimple liquid is active in the sense that it adjusts its flow properties such that it will flow at a rate which is relatively insensitive to the permeability of different strata within a subterranean formation. The positive nonsimple liquid thus operates to increase the recovery of oil from a subterranean formation before the displacing liquid, for example, a flooding water, breaks through at a production well.

Whether a liquid is a positive nonsimple liquid or not can be determined by flow experiments, for example, employing long core samples having different permeabilities, in which apparent viscosity can be measured as a function of shear rate for each permeability. Such flow experiments, however, are very time consuming. On the other hand, rotational viscometers, such as the Couette-type viscometers, having concentric cylinders also can be used to determine whether or not a liquid is a positive nonsimple liquid. Liquids which show an increase in viscosity with larger gap sizes on the viscometer at certain given rates of shear are positive nonsimple liquids. The gap size in a rotational viscometer is the distance separating the concentric cylinder walls immersed in the liquid.

In addition to their performance as positive nonsimple liquids, the solutions used in the method of the invention reduce the interfacial tension and alter the contact angle between the flooding water and the in-situ oil. The surface-active properties of sodium dioctyl sulfosuccinate, i.e., Aerosol OT, have previously been pointed out, e.g., by Calhoun, Stahl, Preston and Nielson, "A Review of Laboratory Experiments on Wetting Agents for Water Flooding," Producers Monthly, vol. 1, November 1951, pp. 15–23; and by Dunning and Johansen, "Laboratory Evaluation of Water Additives for Petroleum Displacement," Report of Investigations 5352, U.S. Department of Interior, Bureau of Mines, July 1957.

When the active solutions are used in the method of the invention, they function both as surfactants and as positive nonsimple liquids. Thus, substantially all of the in-situ oil is swept from the formation around the injection well and less liquid blocking is encountered in subsequent injection of fluids into the injection well. The active solutions continue to function in their dual capacity as surfactants and as positive nonsimple liquids even when intimately admixed with or in the presence of large quantities of hydrocarbons. They remain active over wider range of temperature than some other known positive nonsimple liquids.

The active solutions are prepared by incorporating into water the requisite concentration of the ammonium or alkali metal salt which forms a strong electrolyte in distilled water and the M dialkyl sulfosuccinate. The term "water" is used herein to include dilute aqueous solutions such as surface water, well water, rain water, city water, treated waste water, and suitable oil field brines. Where brine is employed to prepare the active solution, it may contain up to 2.5 percent by weight of sodium chloride. However, brine containing greater amounts of sodium chloride is desirably not employed since concentrations of sodium chloride greater than about 2.5 percent by weight tend to destroy the activity of the active solution.

Illustrative of the ammonium or alkali metal salts which form strong electrolytes in distilled water are the ammonium halides and the alkali metal halides. Sodium chloride is the preferred salt. Illustrative of other salts which form strong electrolytes in distilled water is tetrasodium pyrophosphate. A strong electrolyte is discussed and its requirements set forth at page 506 of Outlines of Physical Chemistry, Farrington Daniels, John Wiley & Sons, Inc., New York, 1948.

In the M dialkyl sulfosuccinates illustrated by structural Formula 1, the dialkyl groups, R′ and R″, contain from 5 to 16 carbon atoms each, inclusive. Preferably, however, they contain 6 to 10 carbon atoms each, inclusive. The best results are obtained, ordinarily, when each alkyl group contains about 8 carbon atoms. Although it is preferred that the dialkyl groups, R′ and R″, be the same, they do not necessarily have to be the same.

The cation M illustrated in structural Formula 1 may be, as stated, lithium, potassium, sodium, ammonium, or the substituted ammonium cations. Illustrative of the substituted ammonium cations are such ions as anilinium, o-toluidinium, p-toluidinium m-toluidinium, methylammonium, ethylammonium, n-propylammonium, iso-propylammonium, n-butylammonium, iso-butylammonium, sec-butylammonium, or tert-butylammonium.

Suitable sodium dialkyl sulfosuccinates include sodium di(2-ethylhexyl) sulfosuccinate, sodium di-iso-octyl sulfosuccinate, sodium di-n-octyl sulfosuccinate, sodium di-iso-nonyl sulfosuccinate, sodium di-n-nonyl sulfosuccinate, sodium di-iso-heptyl sulfosuccinate, sodium di-n-heptyl sulfosuccinate, sodium di-iso-hexyl sulfosuccinate, sodium di-n-hexyl sulfosuccinate, sodium di-iso-decyl sulfosuccinate, and sodium di-n-decyl sulfosuccinate.

Suitable ammonium dialkyl sulfosuccinates include ammonium di(2-ethylhexyl) sulfosuccinate, ammonium di-iso-octyl sulfosuccinate, ammonium di-n-octyl sulfosuccinate, ammonium di-iso-nonyl sulfosuccinate, ammonium di-n-nonyl sulfosuccinate, ammonium di-iso-heptyl sulfosuccinate, ammonium di-n-heptyl sulfosuccinate, ammonium di-iso-hexyl sulfosuccinate, ammonium di-n-hexyl sulfosuccinate, ammonium di-iso-decyl sulfosuccinate, and ammonium di-n-decyl sulfosuccinate.

Typical of suitable substituted ammonium dialkyl sulfosuccinates are the secondary butylammonium dialkyl sulfosuccinates. Suitable secondary butyl ammonium dialkyl sulfosuccinates include sec-butylammonium di(2-ethylhexyl) sulfosuccinate, sec-butylammonium di-iso-octyl sulfosuccinate, sec-butylammonium di-n-octyl sulfosuccinate, sec-butylammonium di-iso-nonyl sulfosuccinate, sec-butylammonium di-n-nonyl sulfosuccinate, sec-butylammonium di-iso-heptyl sulfosuccinate, sec-butylammonium di-n-heptyl sulfosuccinate, sec-butylammonium di-iso-hexyl sulfosuccinate, sec-butylammonium di-n-hexyl sulfosuccinate, sec-butylammonium di-iso-decyl sulfosuccinate, and sec-butylammonium di-n-decyl sulfosuccinate.

The sodium di(2-ethylhexyl) sulfosuccinate is preferred.

The M dialkyl sulfosuccinates are compatible and mixtures thereof may be employed in conjunction with a strong electrolyte-forming salt and water to form an active solution.

The ammonium or alkali metal dialkyl sulfosuccinates are readily synthesized by reacting a maleic anhydride with an alcohol having the desired length alkyl groups and sulfonating with an ammonium or alkali metal bisulfite. When this method of preparation is used, there is realized the preferred embodiment wherein R′ and R″ are the same. The reaction forming sodium dialkyl sulfosuccinate is illustrative and is depicted below:

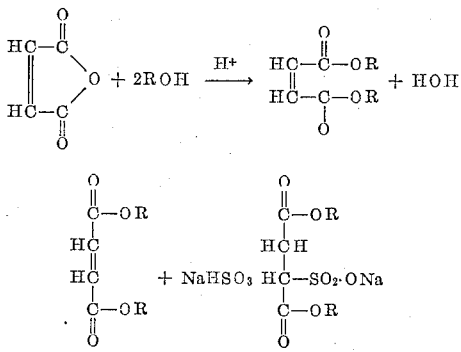

The substituted ammonium dialkyl sulfosuccinates may be obtained by converting the sodium salt to the hydrogen form, using an acid-ion-exchange resin, followed by neutralization with the appropriate amine.

A molar concentration of the ammonium or alkali metal salt which forms a strong electrolyte in water of from 0.04 to 0.77 mol percent is required in forming the active solutions. Preferably, a concentration of from 0.04 to 0.31 mol percent is employed. When sodium chloride is used, the molar concentration of from 0.04 to 0.77 mol percent is equivalent to from 0.13 to 2.5 percent by weight of sodium chloride in the active solution. The preferred amount of sodium chloride on a weight percent basis is from 0.13 to 1.0 percent. The lowest interfacial tension and the greatest activity is obtained at a concentration of about 0.5 percent by weight of sodium chloride in the active solution.

A molar concentration of M dialkyl sulfosuccinate of from 0.0008 to 0.04 mol percent is employed in forming the active solutions. The higher concentrations, e.g., up to 0.04 mol percent are employed only in subterranean formations having either a stratum of extremely high permeability or temperatures in excess of about 40° C. For most subterranean formations, an upper limit of concentration of about 0.008 mol percent of M dialkyl sulfosuccinate is preferred, since higher concentrations create more viscous solutions that necessitate undesirability high pressure drops for their injection and flow in subterranean formations. Moreover, the M dialkyl sulfosuccinate tends to be adsorbed onto the surface of many subterranean formations. The upper limit of concentration of 0.008 includes 0.006 mol percent of M dialkyl sulfosuccinate to compensate for this adsorption. Molar concentrations of from 0.0008 to 0.002 mol percent of M dialkyl sulfosuccinate form the most preferred active solutions from the standpoint of activity and viscosity.

When sodium di(2-ethylhexyl) sulfosuccinate is used in creating the active solution, a concentration of from 0.02 to 1.0 percent by weight is employed. Preferably, a concentration of 0.02 to 0.2 percent by weight is employed. A concentration of 0.02 to 0.05 percent by weight of sodium di(2-ethylhexyl) sulfosuccinate forms the most preferred active solution from the standpoint of activity and viscosity.

The strong electrolyte-forming salt and the M dialkyl sulfosuccinate may be incorporated in only a portion of the water employed in the waterflood to create a slug or slugs of active solution. The slugs should have a volume of from 0.1 to 30 percent, preferably 1 to 10 percent, of the pore volume of the formation. The slug of active solution is injected through the injection well and passed into the formation. The slug may be driven into the formation by injecting behind it a driving fluid such as water or a hydrocarbon gas. Such a slug may be injected only once or may be injected alternately with a volume of driving fluid, preferably having at least the same volume as the slug and preferably being untreated water, between alternate slugs of active solution to achieve the desired recovery of oil from the subterranean formation. Instead of untreated water, water having lower concentrations of the salt forming a strong electrolyte in water and the M dialkyl sulfosuccinate, and hence less activity as a positive nonsimple liquid, may be used between alternate slugs of active solution. Each slug of active solution tends to even out the flow, to alter the pressure gradients, and more nearly to compensate for permeability stratification in the formation. Hence, the greater the number of treated slugs, the more effective will be the flood. The particular formation will dictate the economics of the amount and frequency of the slugs which are to be injected, ranging from one slug to treating all of the flooding water.

It is possible to precipitate a divalent salt such as calcium dialkyl sulfosuccinate if the active solutions employed in the invention come in contact with formation liquids containing divalent ions, such as calcium. It is preferred to take steps to prevent such precipitation. One way to prevent such precipitation is to inject a slug of from 0.01 to 10.0 percent or more of a pore volume of water in advance of the active solution. The water will build up a bank and miscibly displace the aqueous formation liquids containing the divalent ions, thus preventing contact of the active solution with the aqueous formation liquids.

Another way to prevent precipitation of a divalent dialkyl sulfosuccinate is to incorporate into the active solution a chelating or sequestering agent, such as tetrasodium salt of ethylenediaminetetraacetic acid, sold commercially as sodium Versenate, or sodium phosphate glass, commonly called sodium hexametaphosphate, and sold commercially as Calgon. Where a chelating agent is employed, the amount thereof should be at least 0.1 percent by weight. Where sodium chloride is present, or may become present, in the active solution, the total concentration of sodium chloride and chelating agent preferably will not exceed about 2.5 percent by weight. Generally, the amount of chelating agent employed is less than about 1.7 percent by weight. On the other hand, with amounts of sodium chloride less than 0.8 percent by weight, greater amounts of chelating agent may be employed. Alternatively, a slug of from 0.01 to 1.0 percent of a pore volume of an aqueous solution of the chelating or sequestering agent may be injected into the formation ahead of the positive nonsimple liquid.

If desired, both ways of avoiding precipitation of a divalent dialkyl sulfosuccinate may be combined. Thus, a slug of water may be injected into the injection well and passed into the formation, followed by a slug of the chelating agent, prior to the active solution. If the active solution is injected in a slug following the slug of water and the slug of chelating agent in solution, it will be passed through the formation by injecting thereafter a driving fluid such as water. In the event that subsequent slugs of active solution are injected, it is unnecessary to inject the chelating agent or a separate slug of fresh water in advance of such slugs of active solution.

Having thus described the invention, it will be understood that such description has been given by way of illustration and example and not by way of limitation, reference for the latter purpose being had to the appended claims.

What is claimed is:

1. In a method for the recovery of oil from an oil-containing subterranean formation by injecting a flooding liquid through an injection well into said formation and producing oil from said formation through a production well, the improvement comprising injecting into said formation an active aqueous solution having incorporated therein from 0.04 to 0.77 mol percent of at least one salt selected from the group consisting of ammonium salts and alkali metal salts which form strong electrolytes in distilled water, and from 0.0008 to 0.04 mol percent of at least one M dialkyl sulfosuccinate having the following structural formula:

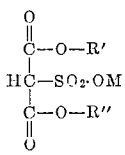

where

M is a cation selected from the group consisting of Li+, K+, Na+, NH4+, anilinium, o-toluidinium, p-toluidinium, n-toluidinium, methylammonium, ethylammonium, n-propylammonium, iso-propylammonium, n - butylammonium, iso - butylammonium, sec-butylammonium, and tert-butylammonium, R' is an alkyl group containing 5 to 16 carbon atoms, inclusive, and R" is an alkyl group containing 5 to 16 carbon atoms, inclusive.

2. The method of claim 1 wherein said salt is an alkali metal halide.

3. The method of claim 2 wherein said alkali metal halide is sodium chloride.

4. The method of claim 1 wherein the total concentration of M dialkyl sulfosuccinate is from 0.0008 to 0.008 mol percent.

5. The method of claim 1 wherein the total concentration of M. dialkyl sulfosuccinate is from 0.0008 to 0.002 mol percent.

6. The method of claim 1 wherein said at least one M dialkyl sulfosuccinate is sodium dialkyl sulfosuccinate wherein said dialkyl groups contain from 6 to 10 carbon atoms each, inclusive.

7. The method of claim 6 wherein said sodium dialkyl sulfosuccinate is sodium di(2-ethylhexyl) sulfosuccinate.

8. The method of claim 7 wherein said sodium di(2-ethylhexyl) sulfosuccinate is in a concentration of from 0.02 to 0.2 percent by weight.

9. The method of claim 7 wherein said sodium di(2-ethylhexyl) sulfosuccinate is in a concentration of from 0.02 to 0.05 percent by weight.

10. The method of claim 1 wherein said at least one M dialkyl sulfosuccinate is sec-butylammonium di(2-ethylhexyl) sulfosuccinate.

11. In a method for the recovery of oil from a subterranean formation by injecting a flooding liquid through an injection well and into said formation, and producing oil from said formation through a production well, the improvement comprising the steps of:

(a) injecting a slug of active solution comprising water and from 0.04 to 0.77 mol percent of at least one salt selected from the group consisting of ammonium salts and alkali metal salts which form strong electrolytes in distilled water, and from 0.0008 to 0.04 mol percent of at least one M dialkyl sulfosuccinate having the following structural formula:

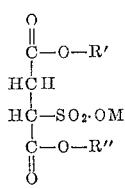

where

M is a cation selected from the group consisting of Li+, K+, Na+, NH4+, and anilinium, o - toluidinium, p - toluidinium, m - toluidinium, methylammonium, ethylammonium, n-propylammonium, iso-propylammonium, n - butylammonium, iso - butylammonium, sec - butylammonium, and tert - butylammonium, R' is an alkyl group containing 5 to 16 carbon atoms, inclusive, R" is an alkyl group containing 5 to 16 carbon atoms, inclusive, said slug of active solution having a volume of about 0.1 to 30 percent of the pore volume of said formation, and (b) injecting a driving fluid through said injection well into said formation whereby said oil in said formation is displaced by said active solution which is in turn displaced by said driving fluid.

12. The method of claim 11 wherein said slug of said active solution has a volume of about 1 to about 10 percent of the pore volume of said formation.

13. The method of claim 11 wherein said driving fluid is water.

14. The method of claim 11 wherein said driving fluid is a hydrdocarbon gas.

15. The method of claim 11 wherein said slug of said active solution is injected alternately with slugs of at least equal volume of said driving fluid.

16. A method of recovering oil from an oil-containing subterranean formation having completed therein an injection means comprising at least one injection well and a production means comprising at least one production well, comprising the steps of:

(a) injecting through said injection means a slug of from 0.01 to 10 percent pore volume of water, (b) injecting through said injection means a slug of from 0.01 to 1 percent pore volume of an aqueous solution containing from 0.1 to 1.7 percent by weight of a chelating agent selecting from the class consisting of tetrasodium ethylenediaminetetraacetic acid and sodium hexametaphosphate, (c) injecting through said injection means a slug of 1 to 10 percent pore volume of an active solution comprising water having incorporated therein from 0.13 to 2.5 percent by weight of sodium chloride and from 0.02 to 0.2 percent by weight of sodium di(2-ethylhexyl) sulfosuccinate, (d) injecting through said injection means water to drive said active solution toward said production means, and (e) simultaneously producing the oil displaced from within said formation through said production means.

References Cited by the Examiner
UNITED STATES PATENTS

| | | | |
|---|---|---|---|
| 2,866,507 | 12/1958 | Bond et al. | 166—9 |
| 3,100,524 | 8/1963 | Beeson | 166—9 |

References Cited by the Applicant
UNITED STATES PATENTS

| | | |
|---|---|---|
| 2,792,894 | 5/1957 | Graham et al. |
| 3,082,822 | 3/1963 | Holm et al. |

OTHER REFERENCES

"A Review of Laboratory Experiemnts on Wetting Agents for Water Flooding," Calhoun, Stahl, Preston and Nielson, Producers Monthly, vol. 1, November 1951, pp. 15–23.

"Laboratory Evaluation of Water Additives for Petroleum Displacement," Dunning and Johansen, Report of Investigations 5352, U.S. Department of Interior, Bureau of Mines, July 1957.

Outlines of Physical Chemistry, p. 506, Farrington Daniels, John Wiley & Sons, Inc., New York, 1948.

JACOB L. NACKENOFF, *Primary Examiner.*

S. J. NOVOSAD, *Assistant Examiner.*

UNITED STATES PATENT OFFICE
CERTIFICATE OF CORRECTION

Patent No. 3,302,712                 February 7, 1967

Harold L. Townsend et al.

It is hereby certified that error appears in the above numbered patent requiring correction and that the said Letters Patent should read as corrected below.

Column 5, lines 4 to 8, the formula should appear as shown below instead of as in the patent:

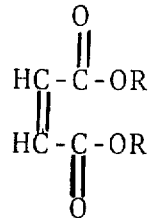

column 7, lines 4 to 9, the formula should appear as shown below instead of as in the patent:

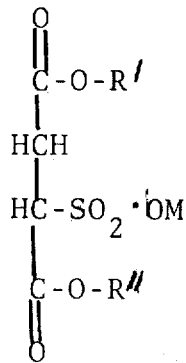

same column 7, line 14, for "n-toluidinium" read -- m-toluidinium --; line 31, for "M. dialkyl" read -- M dialkyl --; column 8, line 62, for "Experiemnts" read -- Experiments --.

Signed and sealed this 17th day of October 1967.

(SEAL)
Attest:

EDWARD M. FLETCHER, JR.            EDWARD J. BRENNER
Attesting Officer                 Commissioner of Patents